United States Patent
Liu et al.

(10) Patent No.: US 10,850,138 B2
(45) Date of Patent: Dec. 1, 2020

(54) QUICK COUPLING FOR SELF-CONTAINED BREATHING APPARATUS HARNESS AND BACKPLATE

(71) Applicant: Honeywell International Inc., Morris Plains, NJ (US)

(72) Inventors: Bruce Liu, Shanghai (CN); Mark Hua, Shanghai (CN); Kevin Lu, Shanghai (CN); Mike Ma, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 222 days.

(21) Appl. No.: 15/776,499

(22) PCT Filed: Nov. 19, 2015

(86) PCT No.: PCT/CN2015/095027
§ 371 (c)(1),
(2) Date: May 16, 2018

(87) PCT Pub. No.: WO2017/084069
PCT Pub. Date: May 26, 2017

(65) Prior Publication Data
US 2018/0339177 A1    Nov. 29, 2018

(51) Int. Cl.
*A62B 9/04* (2006.01)
*A45F 3/14* (2006.01)
(Continued)

(52) U.S. Cl.
CPC .............. *A62B 9/04* (2013.01); *A45F 3/14* (2013.01); *A62B 25/00* (2013.01); *F16B 21/06* (2013.01); *B63C 2011/2281* (2013.01)

(58) Field of Classification Search
CPC . A62B 9/04; A62B 25/00; F16B 21/06; A45F 3/14; B63C 2011/2281
(Continued)

(56) References Cited

U.S. PATENT DOCUMENTS 3,106,323 A * 10/1963 Davis ...................... A62B 9/04
                                                                 224/262
3,957,183 A *  5/1976 Gadberry ................. A45F 3/00
                                                                 224/628
(Continued)

FOREIGN PATENT DOCUMENTS

CN      101879355 A    11/2010
CN      102046243 A     5/2011
(Continued)

OTHER PUBLICATIONS

International Application No. PCT/CN2015/095027, International Search Report, dated Aug. 12, 2016, 4 pages.
(Continued)

*Primary Examiner* — Nathan J Newhouse
*Assistant Examiner* — Lester L Vanterpool
(74) *Attorney, Agent, or Firm* — Alston & Bird LLP

(57) ABSTRACT

Embodiments relate generally to connectors for use with harness and backplate systems in an SCBA. An SCBA may comprise a backplate for holding a cylinder of air and a harness with straps operable to attach to the backplate. Applicants have developed a backplate connector that provides a reliable quick connection and disconnection for straps attached to a backplate. The connector may fit into a slot on the backplate. In some embodiments, a plurality of connectors may be used to connect a plurality of straps to the backplate. Additionally, the connector may comprise a clip or other attachment operable to secure one or more hoses of the SCBA. This design may prevent the air hoses being hooked accidently, and the attachment of the hoses may help to secure the connector into the slot of the backplate, reducing the change of the connector disconnecting during normal usage.

16 Claims, 16 Drawing Sheets

(51) Int. Cl.
    *A62B 25/00*     (2006.01)
    *B63C 11/22*     (2006.01)
    *F16B 21/06*     (2006.01)

(58) Field of Classification Search
    USPC ........................................................ 224/633
    See application file for complete search history.

(56) References Cited

U.S. PATENT DOCUMENTS

| | | | | |
|---|---|---|---|---|
| 4,049,164 | A * | 9/1977 | Sullivan | A45F 3/08 224/633 |
| 4,310,110 | A * | 1/1982 | Dexter | A45F 3/08 224/246 |
| 4,327,851 | A * | 5/1982 | Feathers | A62B 9/04 224/634 |
| D390,650 | S | 2/1998 | Middleton | |
| D391,368 | S | 2/1998 | Hall | |
| D392,036 | S | 3/1998 | McMillan et al. | |
| D404,481 | S | 1/1999 | Schwegman | |
| 5,954,250 | A | 9/1999 | Hall et al. | |
| 6,290,111 | B1 * | 9/2001 | Hedenberg | A45F 3/10 224/262 |
| 8,006,877 | B2 * | 8/2011 | Lowry | A45F 3/04 224/262 |
| 8,196,791 | B2 * | 6/2012 | Hogg | A45F 3/10 224/628 |
| 8,205,775 | B2 * | 6/2012 | Hogg | A62B 9/04 224/628 |
| 8,353,433 | B2 * | 1/2013 | Wrigley | A62B 25/00 224/633 |
| 8,356,692 | B1 * | 1/2013 | Steck | A62B 35/0025 182/3 |
| 8,376,201 | B2 * | 2/2013 | Wrigley | A45F 3/14 224/628 |
| 8,387,844 | B2 | 3/2013 | Wrigley et al. | |
| 8,608,040 | B2 * | 12/2013 | Cheesman | A62B 25/00 224/628 |
| 8,622,268 | B2 | 1/2014 | Townsend et al. | |
| 10,286,233 | B2 * | 5/2019 | Wang | A62B 7/02 |
| 2004/0045991 | A1 * | 3/2004 | Kling | A62B 9/04 224/628 |
| 2004/0200481 | A1 * | 10/2004 | Chapman | A62B 25/00 128/875 |
| 2008/0179366 | A1 | 7/2008 | Hogg | |
| 2008/0257928 | A1 | 10/2008 | Lowry et al. | |
| 2009/0044388 | A1 * | 2/2009 | Kao | A45F 3/14 24/629 |
| 2010/0269822 | A1 | 10/2010 | Shiue | |
| 2010/0282252 | A1 * | 11/2010 | Cheesman | A62B 25/00 128/202.19 |
| 2010/0282261 | A1 | 11/2010 | Wrigley et al. | |
| 2010/0282791 | A1 | 11/2010 | Townsend et al. | |
| 2010/0282793 | A1 * | 11/2010 | Wrigley | B63C 11/22 224/246 |
| 2010/0282795 | A1 | 11/2010 | Wrigley et al. | |
| 2010/0282796 | A1 * | 11/2010 | Wrigley | A62B 25/00 224/257 |
| 2011/0048421 | A1 * | 3/2011 | Carr | B63C 11/02 128/205.22 |
| 2013/0240292 | A1 | 9/2013 | Steck et al. | |
| 2014/0069427 | A1 | 3/2014 | Farnaby et al. | |
| 2014/0224252 | A1 | 8/2014 | Martin et al. | |
| 2014/0345604 | A1 * | 11/2014 | Wang | A62B 7/02 128/202.13 |
| 2015/0090751 | A1 | 4/2015 | Langford et al. | |
| 2015/0144137 | A1 | 5/2015 | Losos et al. | |
| 2015/0144675 | A1 * | 5/2015 | Losos | A45F 3/10 224/637 |
| 2016/0106199 | A1 * | 4/2016 | Hairston | A45F 3/14 224/633 |

FOREIGN PATENT DOCUMENTS

| | | |
|---|---|---|
| CN | 202061279 U | 12/2011 |
| CN | 202802556 U | 3/2013 |
| CN | 108883318 A | 11/2018 |
| EP | 2939711 A1 | 11/2015 |
| EP | 3377183 A1 | 9/2018 |
| GB | 0146846 A | 5/1921 |
| GB | 2418133 A | 3/2006 |
| KR | 20180084885 A | 7/2018 |
| WO | 2012/127204 A2 | 9/2012 |
| WO | 2013/164649 A1 | 11/2013 |
| WO | 2014/132059 A2 | 9/2014 |
| WO | 2017084069 A1 | 5/2017 |

OTHER PUBLICATIONS

International Application No. PCT/CN2015/095027, Written Opinion of the International Searching Authority, dated Aug. 12, 2016, 3 pages.
International Application No. PCT/CN2015/095027, International Preliminary Report on Patentability, dated May 22, 2018, 4 pages.
Europe Patent Application No. 15908566.1, Communication pursuant to Rules 161 (2) and 162 EPC, dated Sep. 12, 2018, 3 pages.
CN Office Action, including Search Report, dated Apr. 14, 2020 for CN Application No. 201580085730.
English Translation of CN Office Action dated Apr. 14, 2020 for CN Application No. 201580085730.
English translation of CN Search report dated Apr. 5, 2020 for CN Application No. 201580085730.
European Search Report and Search Opinion Received for EP Application No. 159085661, dated Aug. 30, 2019, 7 pages.

* cited by examiner

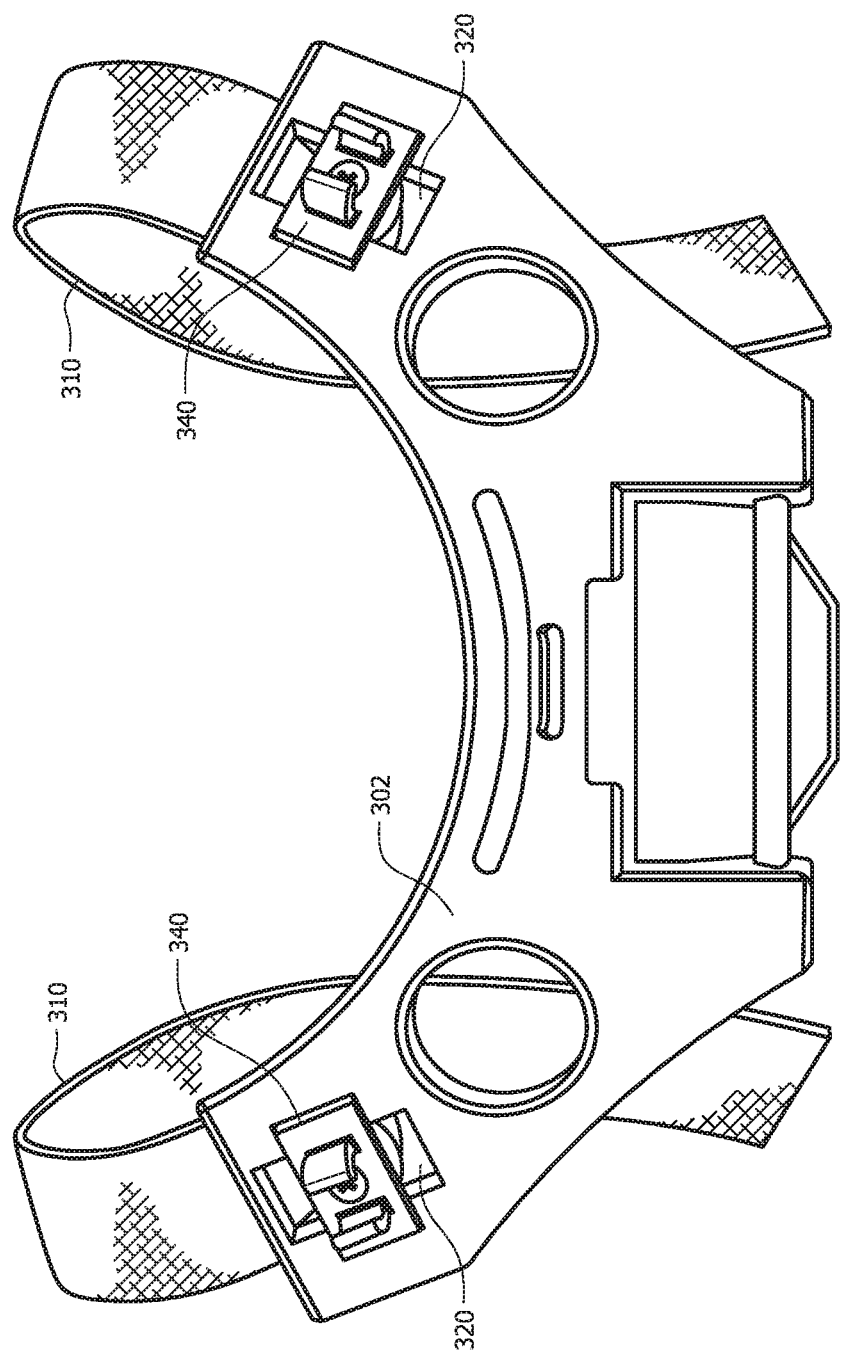

QUICK COUPLING FOR SELF-CONTAINED BREATHING APPARATUS HARNESS AND BACKPLATE

CROSS-REFERENCE TO RELATED APPLICATIONS

The present application is the National Stage of International Application No. PCT/CN2015/095027 filed on Nov. 19, 2015 and entitled "Quick Coupling For Self-Contained Breathing Apparatus Harness And Backplate" which is incorporated herein by reference as if reproduced in its entirety.

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A self-contained breathing apparatus (SCBA) may comprise a backplate for holding a cylinder of breathable air. The backplate may be worn on a user's back, wherein the backplate may be operable to attach to a harness and/or straps for securing the backplate to the user's back, such as at the user's shoulders and/or waist. The backplate may also attach to other elements of the SCBA.

SUMMARY

Aspects of the disclosure may include embodiments of a backplate system for use with an SCBA comprising a backplate operable to attach to a cylinder; a shoulder plate operable to attach to the backplate, wherein the shoulder plate comprises one or more slots; a waist plate operable to attach to the backplate, wherein the waist plate comprises one or more slots; a harness system comprising one or more straps; one or more connector operable to attach to the one or more straps and operable to fit into the slots of the shoulder plate and the waist plate, wherein the connector comprises a main body operable to fit through the slot, and operable to be secured into a portion of the slot; a base operable to attach to the strap; a piston attached to the main body operable to move and rotate with the main body, wherein the piston fits within a portion of the base; a spring located between a portion of the piston and a portion of the base, wherein the spring biases the piston downward, thereby biasing the main body toward the base, a clip operable to secure one or more elements of the SCBA; an axis, and wherein the strap is removably attached to the axis; and a cover operable to fit over a portion of the piston, a portion of the base, and the spring.

Additional aspects of the disclosure may include embodiments of a backplate system for use with an SCBA comprising a backplate operable to attach to a cylinder; a shoulder plate operable to attach to the backplate, wherein the shoulder plate comprises one or more slots; a waist plate operable to attach to the backplate, wherein the waist plate comprises one or more slots; a harness system comprising one or more straps; one or more connector operable to attach to the one or more straps and operable to fit into the slots of the shoulder plate and the waist plate, wherein the connector comprises a main body operable to fit through the slot, and operable to be secured into a portion of the slot; a base operable to attach to the strap; a piston attached to the main body operable to move and rotate with the main body, wherein the piston fits within a portion of the base; and a spring located between a portion of the piston and a portion of the base, wherein the spring biases the piston downward, thereby biasing the main body toward the base.

In some embodiments, the slot comprises an opening and a half-slot, wherein the opening extends through the shoulder plate or waist plate, wherein the half-slot extends approximately halfway into the thickness of the opening, and wherein the main body fits upward through the opening, rotates approximately 90 degrees, and fits downward into the half-slot. In some embodiments, the spring biases the main body into the half-slot. In some embodiments, the opening, the half-slot and the main body are rectangular shaped, and wherein the rectangular shape of the half-slot is rotated 90 degrees from the rectangular shape of the opening. In some embodiments, the connector further comprises an axis, and wherein the strap is removably attached to the axis. In some embodiments, the axis threads into an opening in the base of the connector. In some embodiments, the connector further comprises a cover operable to fit over a portion of the piston, a portion of the base, and the spring. In some embodiments, the connector further comprises a clip operable to secure one or more elements of the SCBA. In some embodiments, the clip comprises a rounded shape operable to fit about a hose of the SCBA.

Other aspects of the disclosure may include embodiments of a connector operable to attach to a slot in a backplate system an SCBA, wherein the connector comprises a main body operable to fit through the slot, and operable to be secured into a portion of the slot; a base operable to attach to a strap, wherein the strap is a part of a harness system; a piston attached to the main body operable to move and rotate with the main body, wherein the piston fits within a portion of the base; and a spring located between a portion of the piston and a portion of the base, wherein the spring biases the piston downward, thereby biasing the main body toward the base.

In some embodiments, the connector may further comprise an axis, and wherein the strap is removably attached to the axis. In some embodiments, the axis threads into an opening in the base of the connector. In some embodiments, the connector may further comprise a cover operable to fit over a portion of the piston, a portion of the base, and the spring. In some embodiments, the slot in the backplate system comprises an opening and a half-slot, wherein the half-slot extends approximately halfway into the thickness of the opening, and wherein the main body fits upward through the opening, rotates approximately 90 degrees, and fits downward into the half-slot. In some embodiments, the spring biases the main body into the half-slot. In some embodiments, the backplate system comprises a plurality of slots. In some embodiments, the slot is located on a shoulder plate of the backplate system, and wherein the strap comprises a shoulder strap. In some embodiments, the slot is location on a waist plate of the backplate system, and wherein the strap comprises a waist strap. In some embodiments, the connector further comprises a clip operable to secure one or more elements of the SCBA.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 11A-11B illustrate detailed views of a shoulder plate according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include connectors for use with harness and backplate systems in an SCBA. An SCBA may be used to provide compressed fresh air to a user (such as a firefighter, oil worker, etc.) and protect them from possibly hazardous ambient air.

Figure 1:
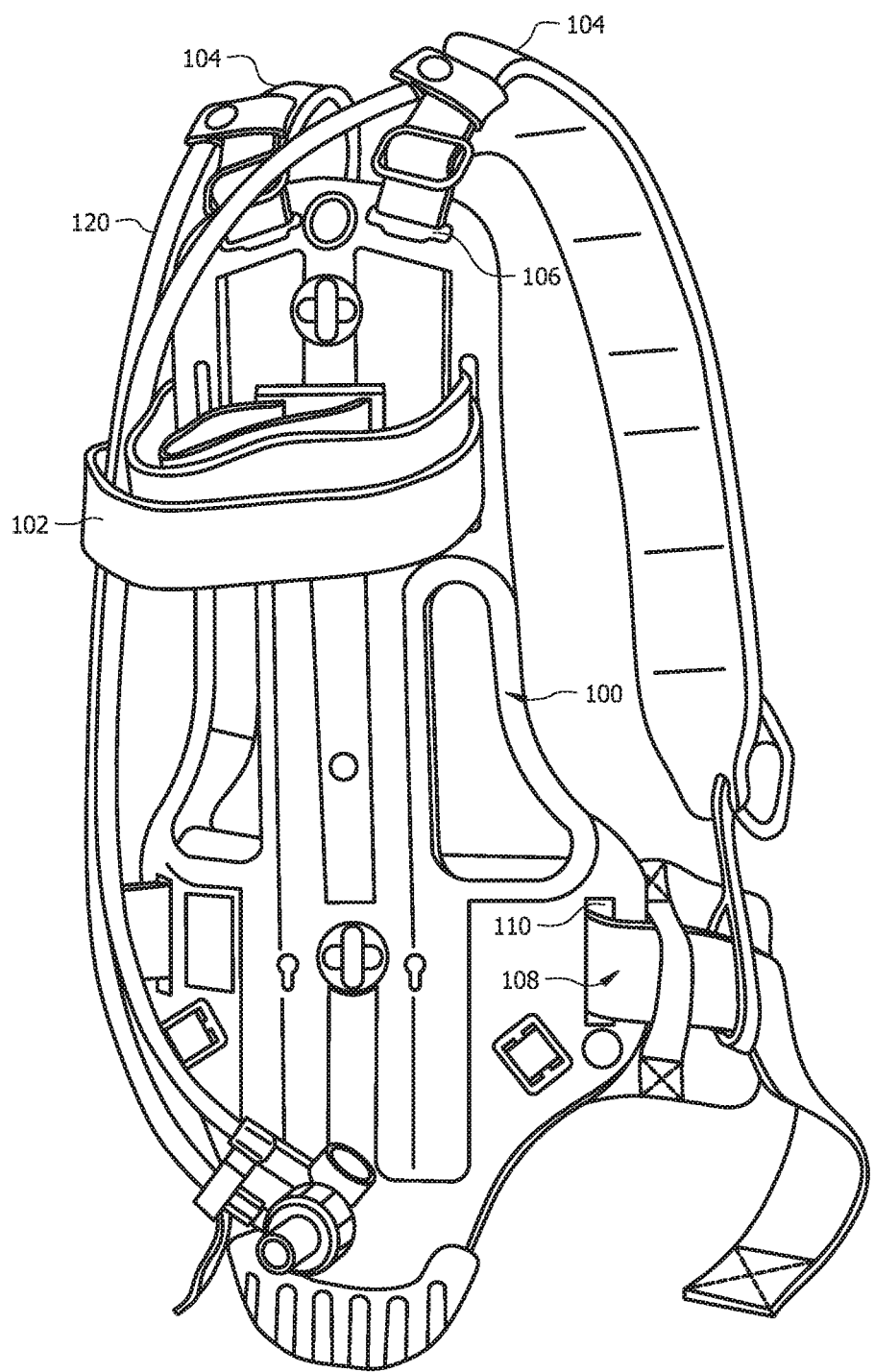
FIG. 1 illustrates an exemplary embodiment of a backplate for use with an SCBA system.

Referring to FIG. 1, a typical SCBA backplate 100 is shown, wherein the backplate 100 comprises shoulder straps 104 and waist straps 108 attached to the backplate 100. These straps may allow the user to carry the whole apparatus on their backs and waists. Additionally, the backplate 100 may comprise a cylinder strap 102 for securing a cylinder of breathable gas to the backplate 100. In some embodiments, the backplate 100 may comprise hoses 120 for carrying air from a cylinder. In the embodiment shown in FIG. 1, the straps 104 and 108 may attach to the backplate 100 via slots 106 and 110 respectively. The slots 106 and 110 may comprise one opening, or a plurality of openings.

Figure 2A:
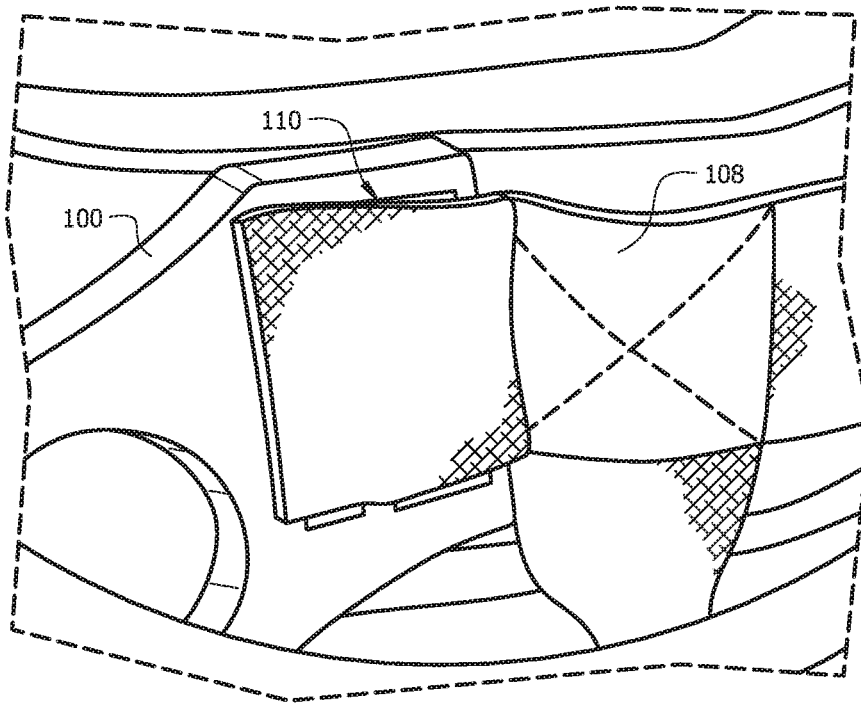
FIGS. 2A-2B illustrates an exemplary embodiment of a strap connection for a backplate.
Figure 2B:
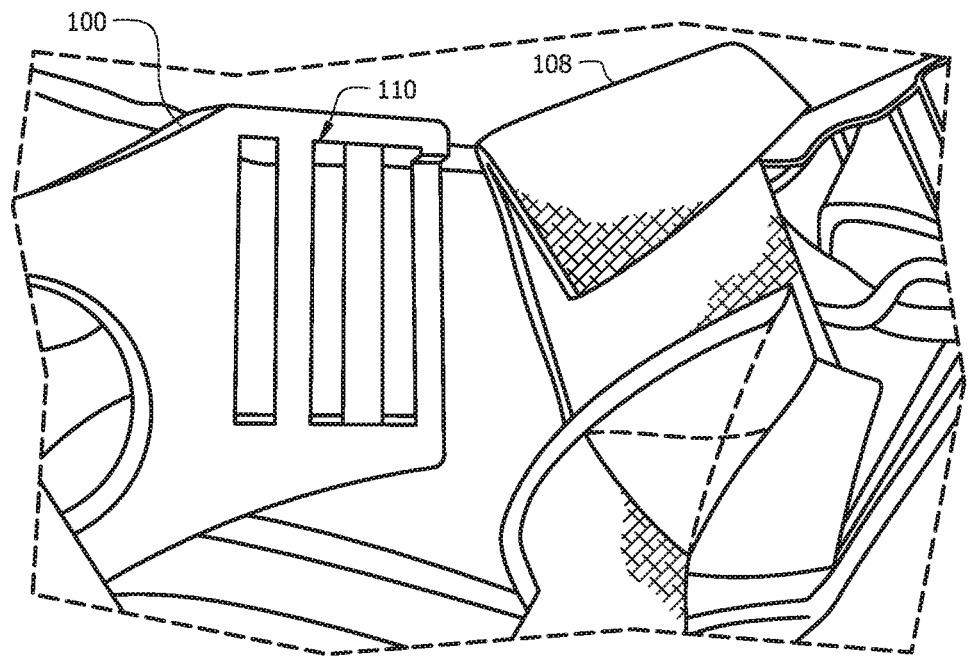

Referring now to FIG. 2, an exemplary connection between the strap 108 and the backplate 100 is shown, wherein the backplate 100 comprises a plurality of slots 110, and a portion of the strap 108 is threaded through the slots 110. In some embodiments, the strap 108 may fold back on itself. In some embodiments, the strap 108 may secure to a portion of itself. This type of connection between the strap 108 and the backplate may make the strap difficult to remove the backplate 100, possibly taking 20 minutes or more to disconnect the straps 108 it from the backplate 100. Therefore, it may cost the user time, energy, and possibly additional tools if the user wants to remove the straps 108 to be cleaned or replaced. Additionally, during the remove and replacement of the straps 108, the strap 108 and/or the backplate 100 could be easily damaged, such as broken stitches or pilling on the straps 108, or damage to the slots 110. Also, the hoses used in an SCBA may require additional components to fix the hoses in place on a backplate and/or strap, to prevent the hoses from being hooked and/or damaged during use.

Applicants have developed a backplate connector that provides a reliable quick connection and disconnection for straps attached to a backplate. The connector may increase the maintenance and production efficiency for the user, allowing the user to remove and replace straps more easily. The connector is described in detail below. The connector may fit into a slot on the backplate. In some embodiments, a plurality of connectors may be used to connect a plurality of straps to the backplate.

Additionally, the connector may comprise a clip or other attachment operable to secure one or more hoses of the SCBA. This design may prevent the air hoses being hooked accidently, and the attachment of the hoses may help to secure the connector into the slot of the backplate, reducing the change of the connector disconnecting during normal usage.

Figure 3:
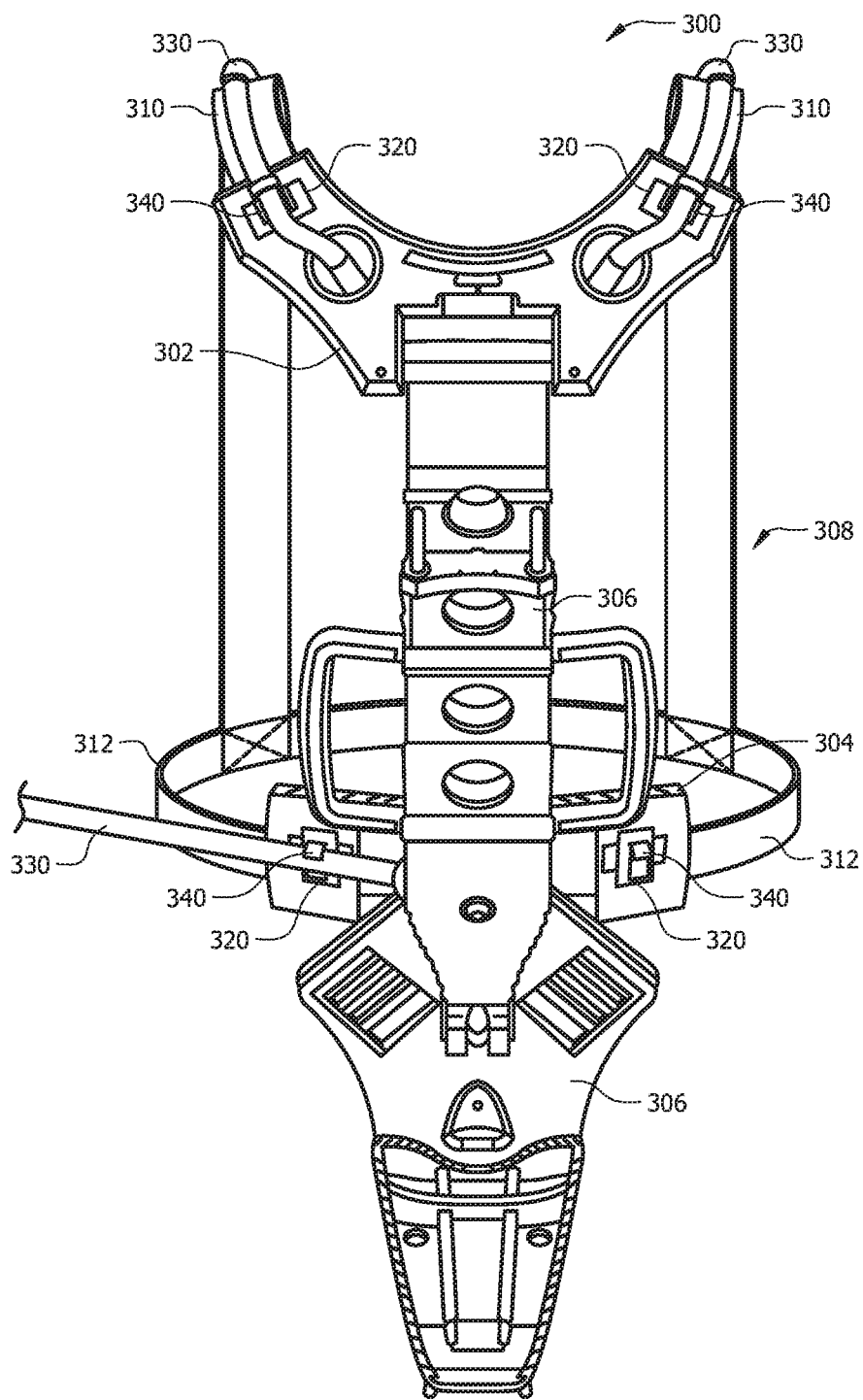
FIG. 3 illustrates a backplate system for use with an SCBA system according to an embodiment of the disclosure.

Referring now to FIG. 3, an exemplary embodiment of a backplate system 300 is shown, wherein the backplate system 300 comprises a shoulder plate 302, a waist plate 304, and a backplate 306. The shoulder plate 302 may be operable to connect to shoulder straps 310. The waist plate 304 may be operable to connect to waist straps 312. The shoulder straps 310 and waist straps 312 may be a part of a harness system 308, wherein the harness system 308 may also comprise other straps and/or attachments. The backplate 306 may be operable to attach to a cylinder of breathable air, which may be part of an SCBA system. In some embodiments, the shoulder plate 302 and waist plate 304 may be movably attached to the backplate 306, wherein the shoulder plate 302 and waist plate 304 may move with respect to the backplate 306.

In the embodiment of FIG. 3, the shoulder plate 302 may comprise one or more slots 320 operable to receive one or more connectors 340. The connectors 340 may be operable to fit through and be secured in the slots 320, as will be described in more detail below. In some embodiments, the waist plate 304 may comprise one or more slots 320 operable to receive one or more connectors 340. The connectors 340 may be operable to fit through and be secured in the slots 320, as will be described in more detail below. In some embodiments, the connectors 340 may be operable to hold one or more hoses 330, wherein the hoses 330 may be a part of an SCBA system.

Figure 4:
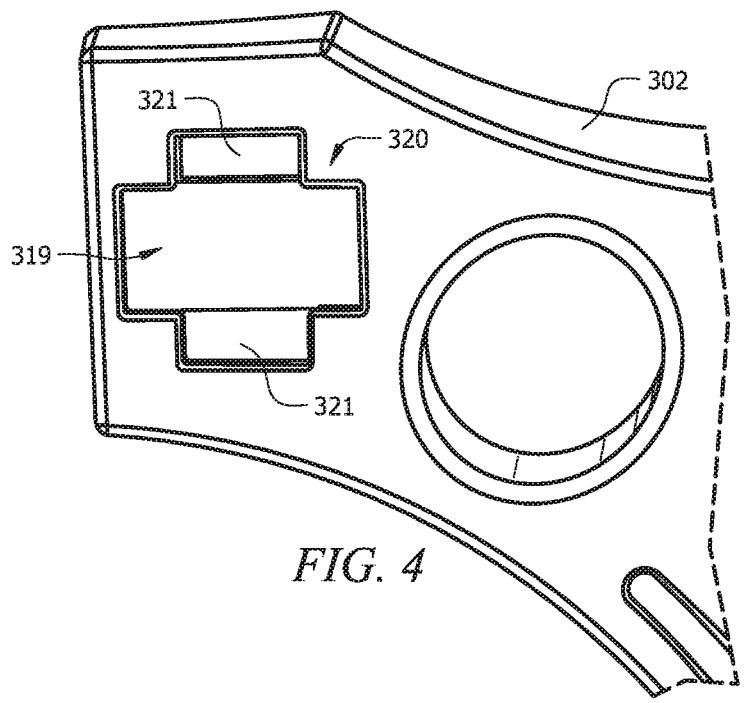
FIG. 4 illustrates a detailed view of a slot in a backplate system for use with a connector according to an embodiment of the disclosure.

Referring now to FIG. 4, a detailed view of the slot 320 is shown. In some embodiments, the slot 320 may comprise an opening 319 and a half-slot 321, wherein the half-slot 321 is cut into approximately half the thickness of the opening 319. In some embodiments, the opening 319 may comprise a rectangular shape, and the half-slot 321 may comprise a similar rectangular shape, wherein rectangular shape of the half-slot 321 may be rotated approximately 90 degrees from the rectangular shape of the opening 319. In some embodiments, the shape of the slot 320 and connector may be different than rectangular, such as circular, oval, or another shape.

The slot 320 shown in FIG. 4 may be the slot 320 in a shoulder plate 302, but the slots 320 of the shoulder plate 302 and waist plate 304 may be similar to one another. Additionally, the connectors 340 that fit into the slots 320 may be similar to one another. In other embodiments, the connectors 340 and/or slots 320 may vary in size. In some embodiments, the slots 320 and/or connectors 340 may be used on the shoulder plate 302 and not the waist plate 304, while in other embodiments, the slots 320 and/or connectors 340 may be used on the waist plate 304 and not the shoulder plate 302.

Figure 5A:
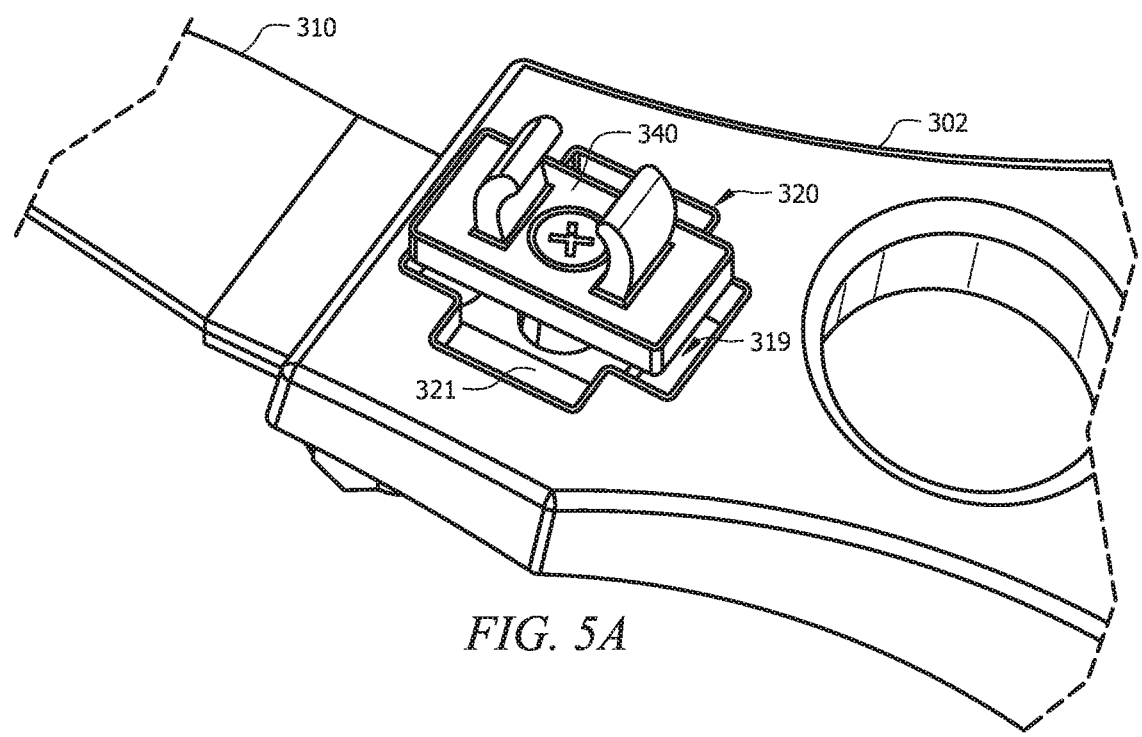
FIGS. 5A-5B illustrate detailed views of a connector fitting into a slot in a backplate system according to an embodiment of the disclosure.
Figure 5B:
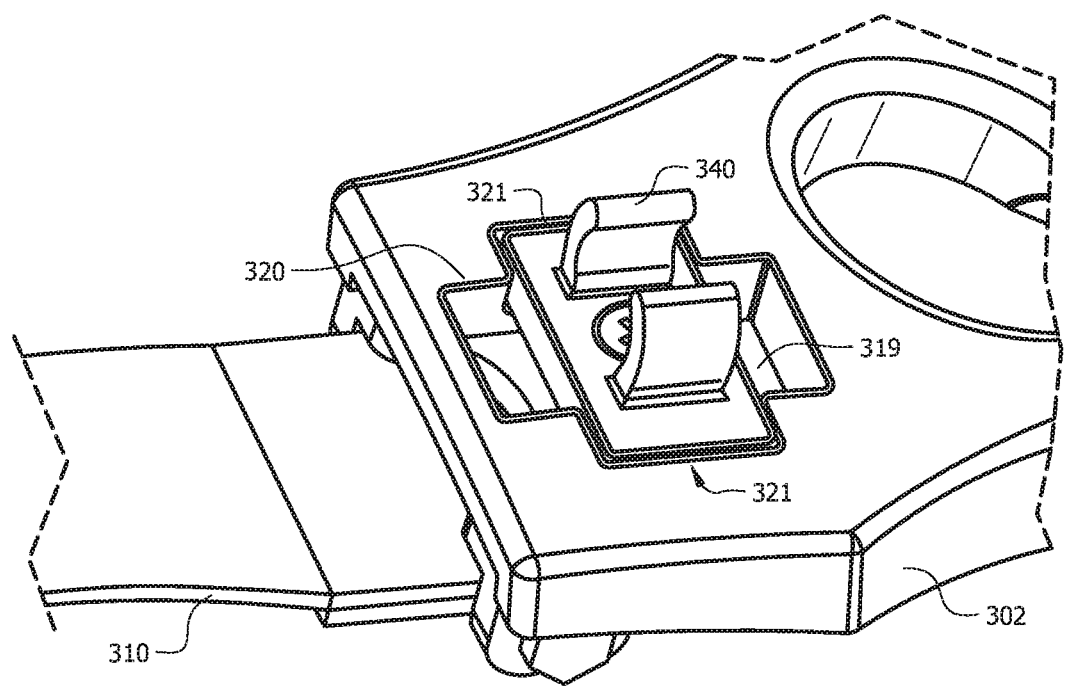

FIGS. 5A-5B illustrate a connector 340 being inserted into a slot 320. The connector 340 may pass upward through the opening 319 of the slot 320, as shown in FIG. 5A. The connectors 340 may be attached to a strap 310. As shown in FIG. 5B, after a portion of the connector 340 has passed through the opening 319, a portion of the connector 340 may rotate approximately 90 degrees. Then, a portion of the connector 340 may bet fitted into the half-slot 321 of the slot 320. In some embodiments, the connector 340 may comprise a spring operable to bias the portion of the connector 340 that is fitted into the half-slot toward the portion of the connector 340 located below the slot 320.

Figure 6A:
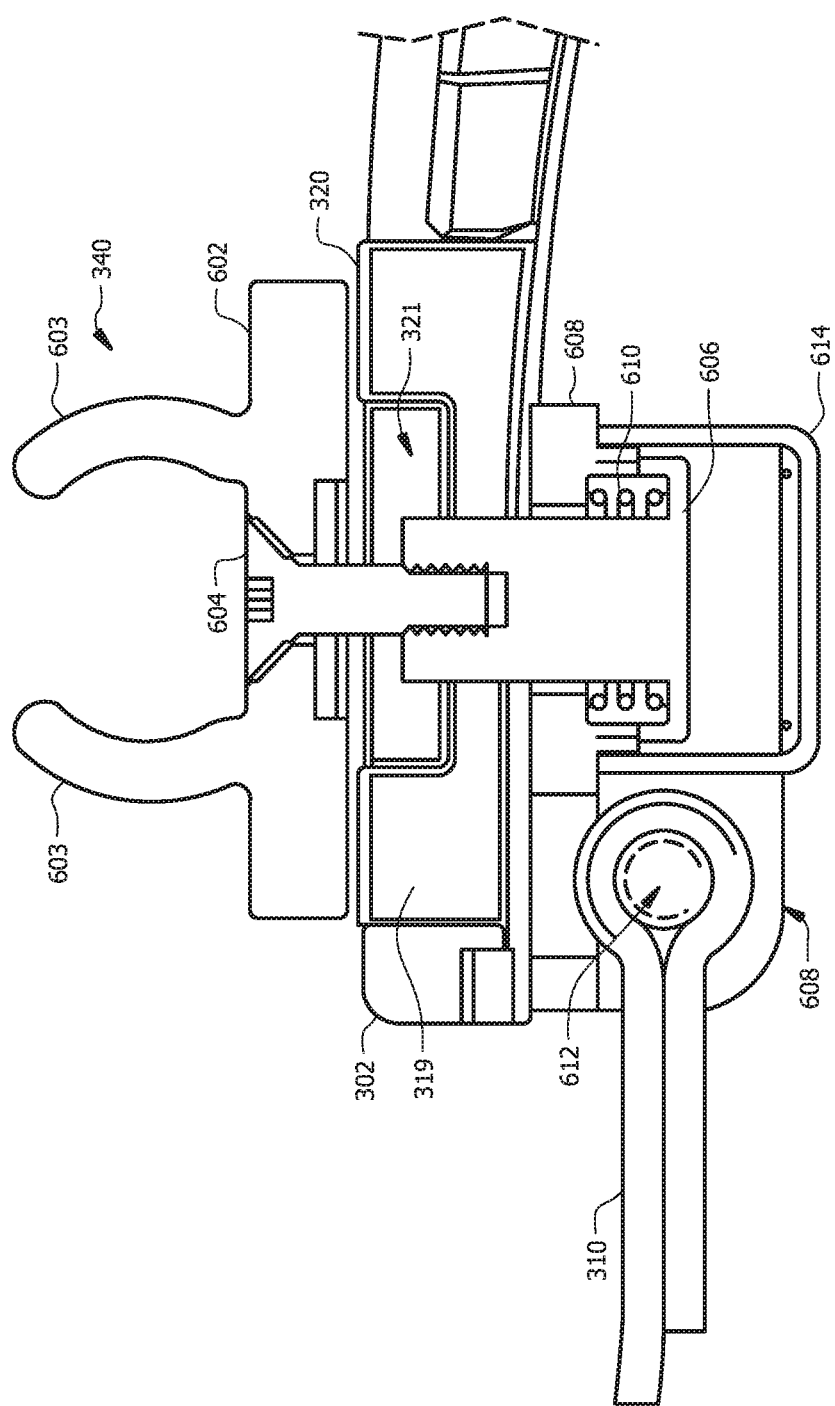
FIGS. 6A-6B illustrate additional detailed views of a connector fitting into a slot in a backplate system according to an embodiment of the disclosure.
Figure 6B:
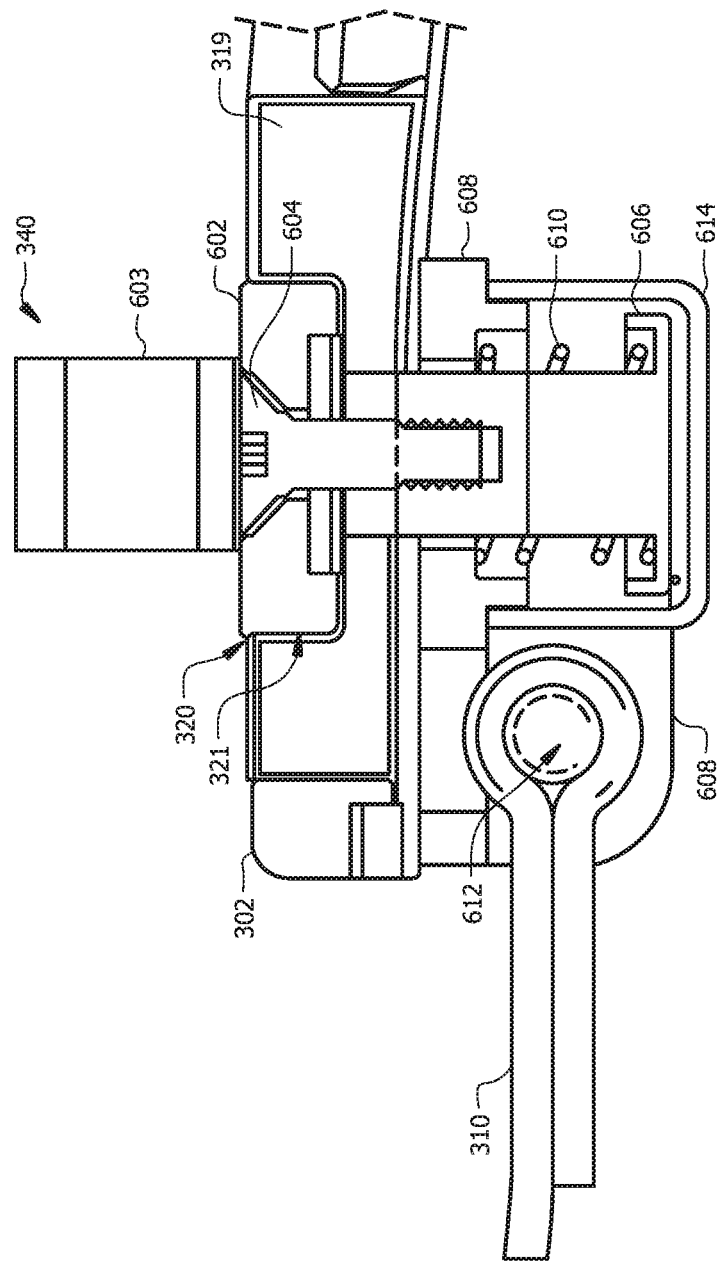

Referring now to FIGS. 6A-6B, cross-sectional views of the connector 340 and slot 320 are shown. The connector 340 may comprise a main body 602 operable to fit through the opening 319 of the slot 320. The connector 340 may comprise a piston 606, wherein the piston 606 may connect to the main body 602. In some embodiments, the piston 606 may connect to the main body 602 with a screw 604. The connector 340 may also comprise a base 608, wherein the piston 606 and the main body 602 may be operable to move with respect to the base 608. In some embodiments, the connector 340 may comprise a screw 610 located about the piston 606, wherein the spring 610 may be located between a bottom portion of the piston 606 and a portion of the base 608.

In some embodiments, the connector 340 may comprise a cover 614 operable to attach to the base 608 to protect the spring 610 and the piston 606 from the outside environment and movement. In some embodiments, the main body 602 may comprise a clip shaped part (or clip) 603 operable to fit about a breathing air hose, for example. In some embodiments, the clip 603 may extend through the top of the slot 602, allowing a hose 330 (shown in FIG. 3) to be held by the clip 603. In some embodiments, the main body 602 may comprise other attachments for holding other elements of an SCBA system in place, depending on the placement of the connector 340.

In some embodiments, the base 608 may attach to an axis 612, wherein the axis 612 may attach the connector 340 to a strap 310. The strap 310 may fit around the axis 612 and may be operable to rotate with respect to the base 608. In some embodiments, the strap 210 may be removed and replaced, while the connector 340 may be reused.

In the embodiment shown in FIG. 6A, the main body 602 of the connector 340 has been pulled upward and passed through the opening 319 of the slot 320. The spring 610 may be compressed between the base 608 and the bottom portion of the piston 606 by the upward movement of the main body 602 (and therefore of the piston 606).

In the embodiment shown in FIG. 6B, the main body 602 and therefore the piston 606 may have been rotated approximately 90 degrees, and lowered into the half-slot 321 of the slot 320. In the embodiment shown, the piston 606, the screw 604, the main body 602, and possibly the spring 610 may rotate freely with respect to the base 608. With the main body 602 resting in the half-slot 321, the spring 610 may be uncompressed, and therefore may bias the main body 602 downward toward the base 608. The spring 610 may secure the main body 602 within the half-slot 321, wherein the main body 602 would be required to be lifted upward against the spring's bias and rotated approximately 90 degrees for the main body 602 to pass through the opening 319 and out of the slot 320. This movement of lifting and rotating the main body 602 may be accomplished easily by a user, but may be unlikely to happen spontaneously without action by the user. The spring bias may ensure that the connector 340 may not get loose accidently due to factors such as vibration or movement by the user.

The half-slot 321 and the main body 602 may be shaped similarly, such that the main body 602 fits securely within the half-slot 321, but may be easily lifted out of the half-slot 321 by a user. Similarly, the opening 319 may be shaped similarly to the half-slot 321 and the main body 602, such that the main body 602 fits easily through the opening 319, but may be unlikely to slip through the opening 319 without action by the user.

Referring now to FIGS. 7A-7D, detailed views of the connector 340 are shown. As described above, the connector 340 may comprise a base 608, a main body 602, a piston 606 operable to fit within the base 608 and connect to the main body 602 by a screw 604, and an axis 612 connected to the base 608 operable to connect the base 608 to a strap (not shown). The connector 340 may also comprise a cover 614 operable to fit over and protect some of the elements of the connector 340. The main body 602 may comprise a clip 603 or another attachment operable to secure one or more elements of an SCBA system, such as a hose.

In some embodiments, the axis 612 thread into an opening 708 in the base 608, and the axis 612 may fit through another opening 709 in the base 608. In some embodiments, the axis 612 may comprise a head 613 to allow a user to insert, thread, or remove the axis 612 as needed. For example the axis 612 may be removed to allow for removal of the strap, for cleaning or replacement.

Figure 7A:
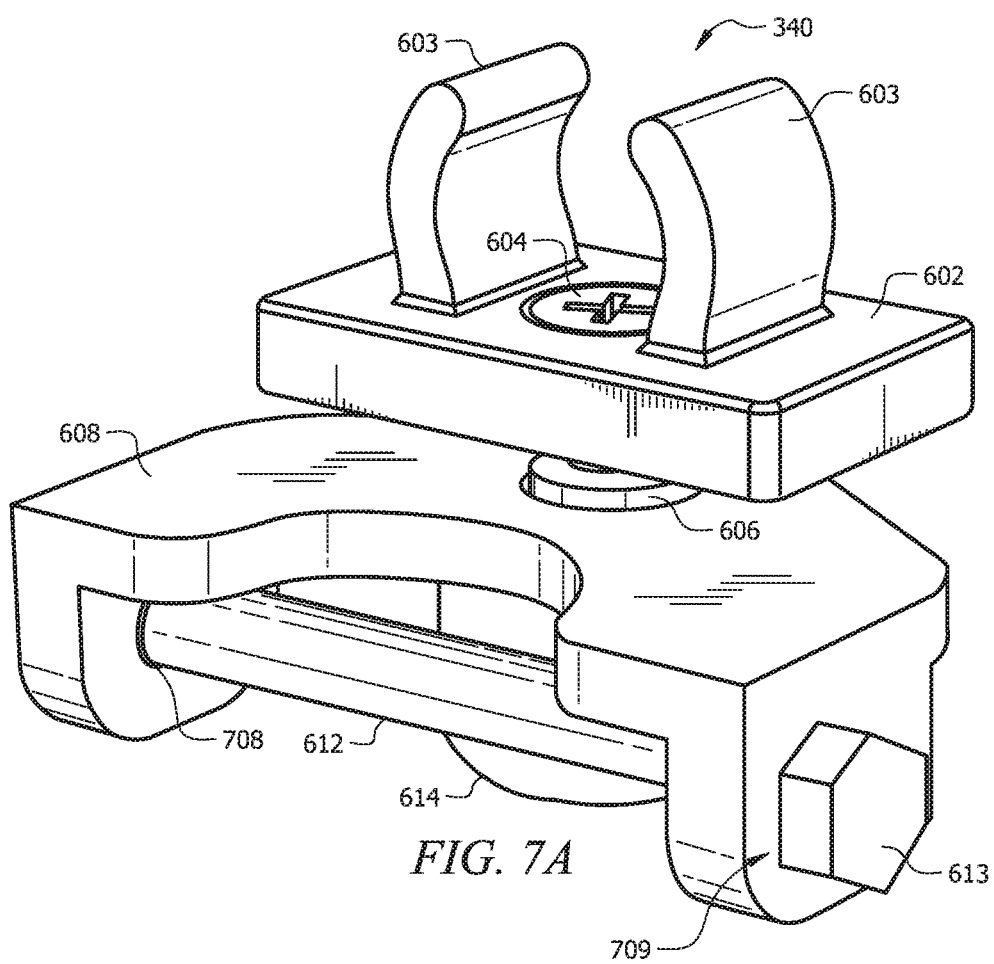
FIGS. 7A-7D illustrate detailed views of a connector according to an embodiment of the disclosure.
Figure 7B:
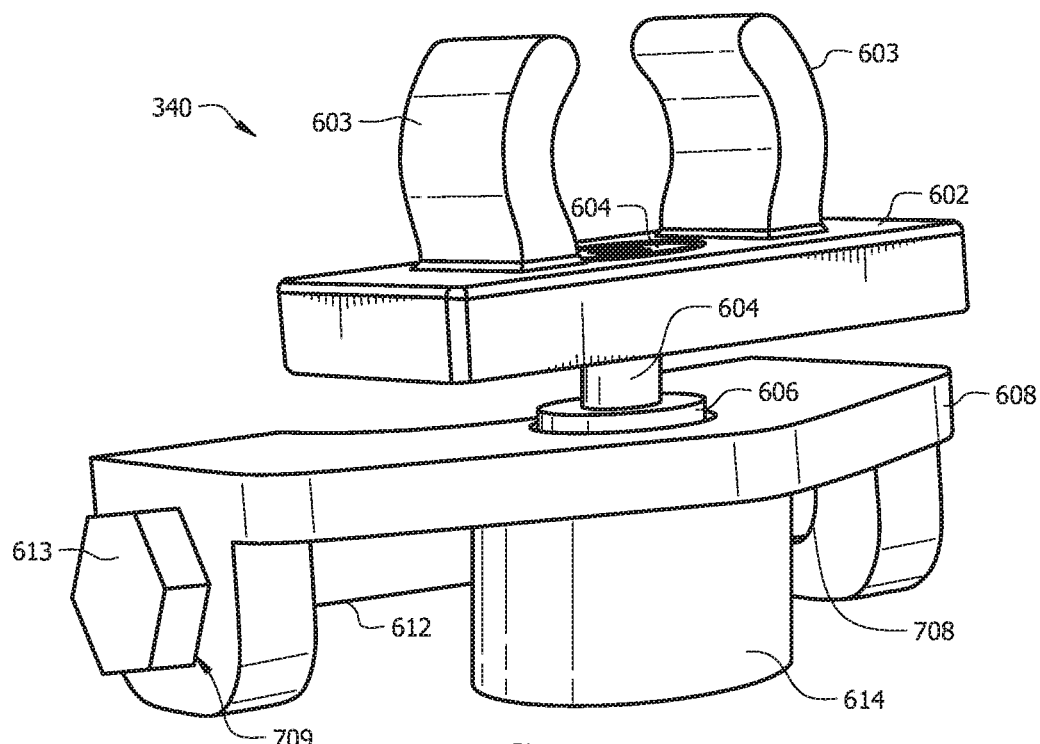

FIGS. 7A and 7B show front and back views of the assembled connector 340.

Figure 7C:
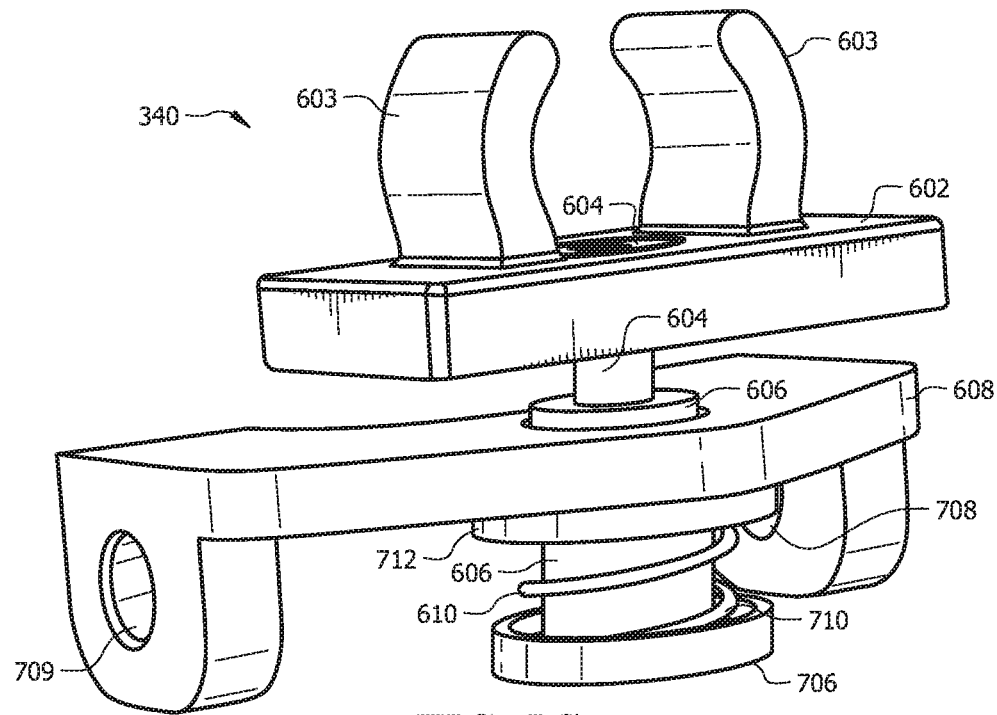

FIG. 7C shows the connector 340 with the cover 614 and the axis 612 removed. The piston 606 and 610 are shown. A portion 706 of the piston 606 may be shaped to hold a portion 710 of the spring 610. A portion of the piston 606 may extend through the base 608, possibly when the main body 602 is lifted by a user. In some embodiments, the cover 314 may be operable to fit over a portion 708 of the base 608.

Figure 7D:
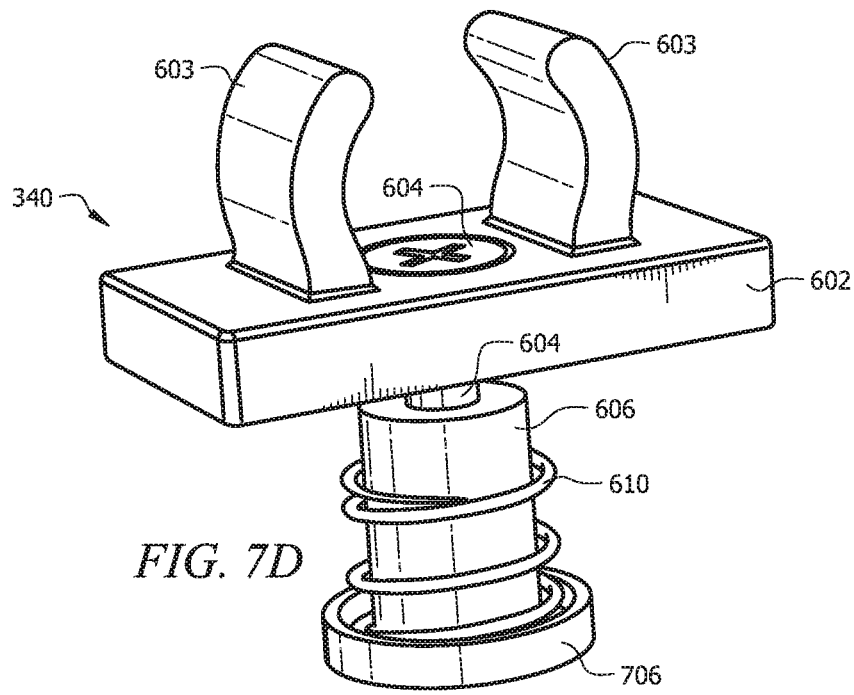

FIG. 7D shows the connector 340 with the cover 614, the axis 612, and the base 608 removed.

Figure 8:
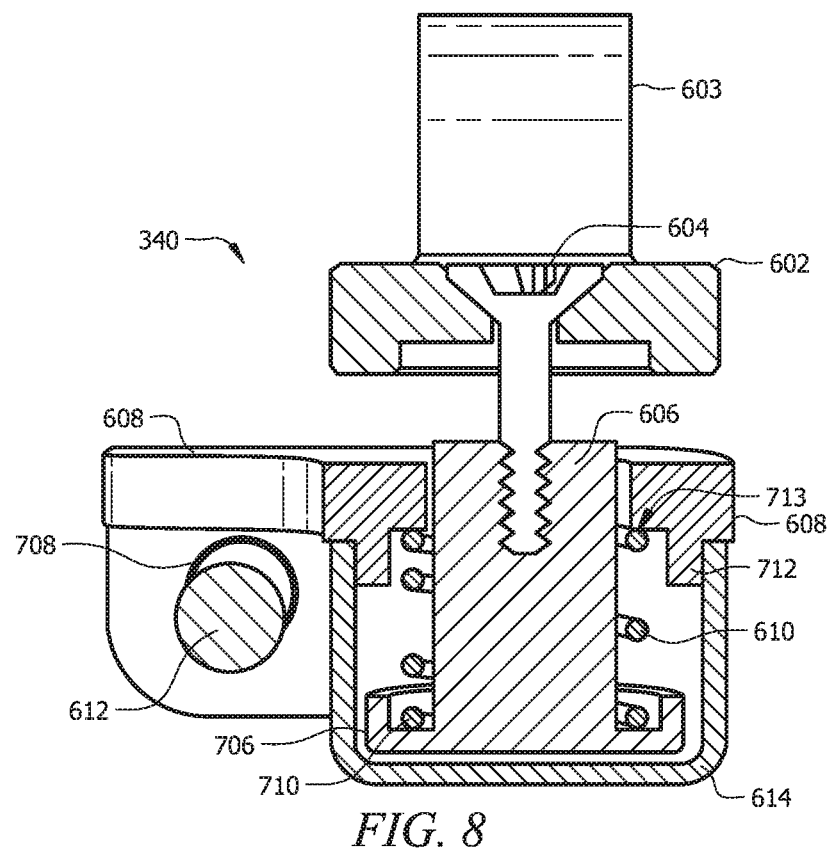
FIG. 8 illustrates a cross-sectional view of a connector according to an embodiment of the disclosure.

FIG. 8 shows a cross-sectional view of the connector 340. As described above, the spring 610 may be located between a portion 706 of the piston 606 and a portion 713 of the base 608, wherein when the piston 606 is moved upward (with the main body 602), the spring 610 may be compressed between the portion 706 of the piston 606 and the portion 713 of the base 608. As described above, the cover 614 may fit over a portion 712 of the base 608. In some embodiments, the portion 706 of the piston 606 may be larger in diameter than the rest of the piston 606, and may therefore ensure that the piston 606 does not completely exit the base 608 when the main body 602 is lifted by the user.

Figure 9:
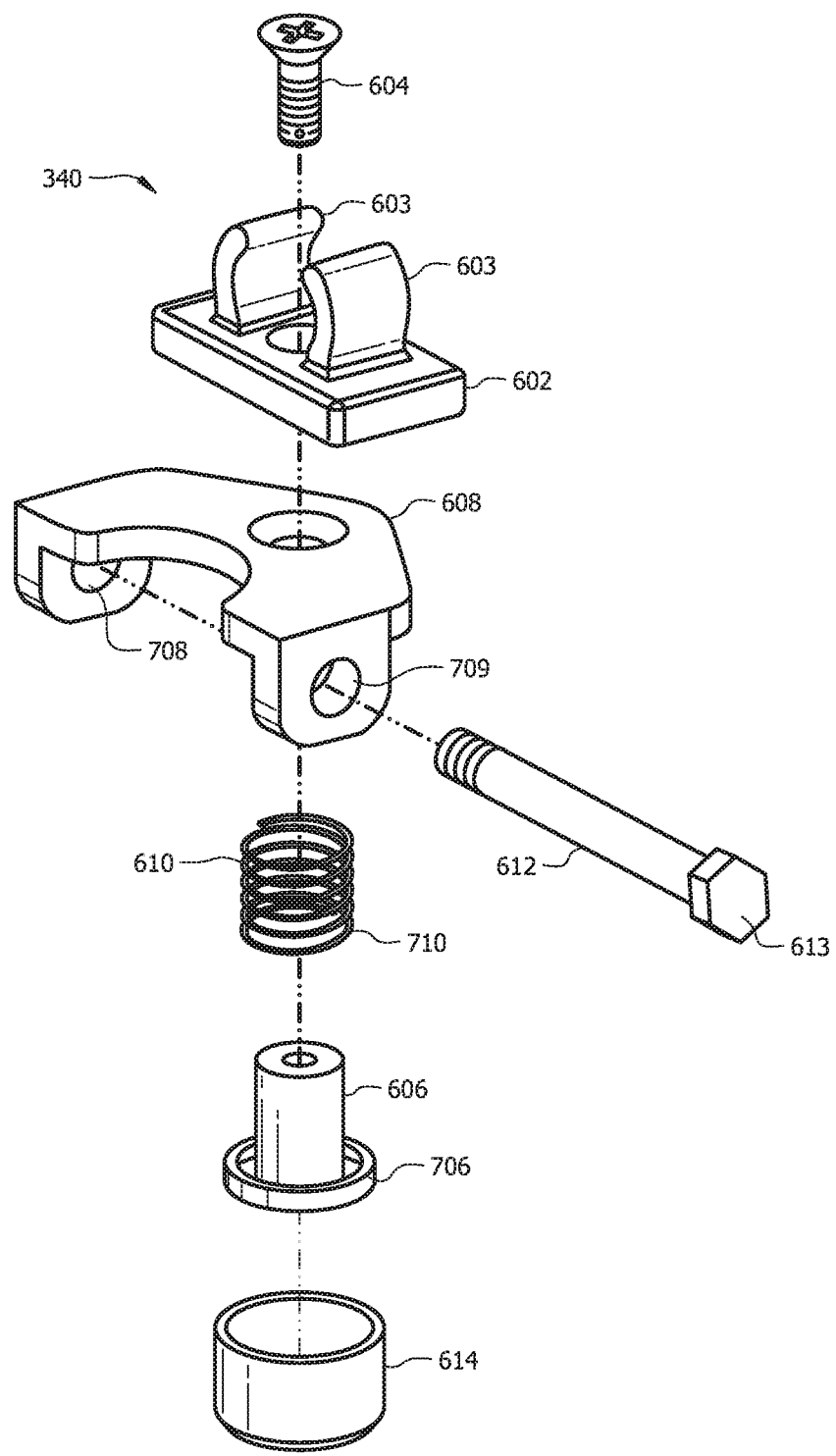
FIG. 9 illustrates an exploded view of a connector according to an embodiment of the disclosure.

FIG. 9 shows an exploded view of the connector 340. All of the elements can be seen individually. The screw 604 may fit through the main body 602 and thread into the piston 606. The spring 610 may fit over the piston 606 and fit into the bottom portion 706 of the piston 606. A portion of the piston 606 may fit into the base 608, and the cover 614 may fit over the piston 606 and spring 610 and attach to the base 608.

Figure 10:
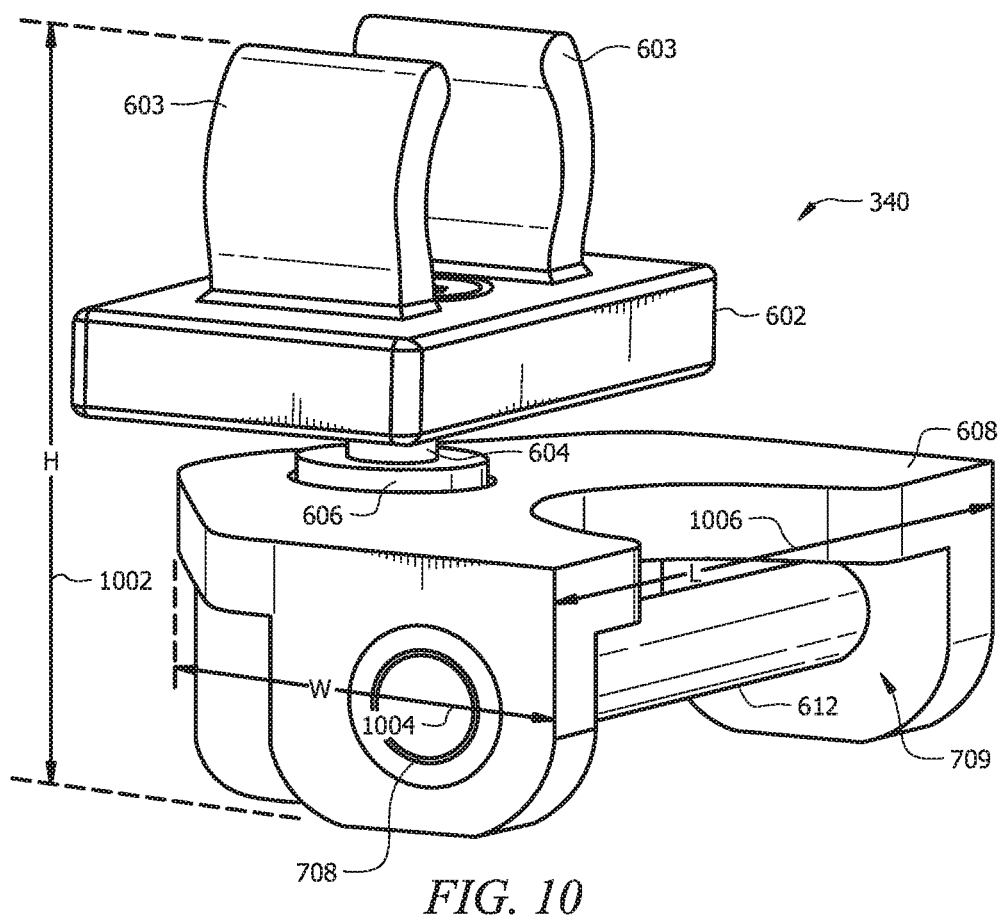
FIG. 10 illustrates another detailed view of a connector according to an embodiment of the disclosure.

FIG. 10 shows exemplary dimensions of the connector 340. In some embodiments, the height 1002 of the connector 340 may be approximately 3.2 centimeters (cm). In some embodiments, the height 1002 of the connector 340 may be between approximately 2 cm and 5 cm. In some embodiments, the height 1002 of the connector 340 may be between approximately 1 cm and 10 cm. In some embodiments, the width 1004 of the connector 340 may be approximately 2.9 cm. In some embodiments, the width 1004 of the connector 340 may be between approximately 2 cm and 5 cm. In some embodiments, the width 1004 of the connector 340 may be between approximately 1 cm and 10 cm. In some embodiments, the length 1006 of the connector 340 may be approximately 4.5 cm. In some embodiments, the length 1006 of the connector 340 may be between approximately 2 cm and 6 cm. In some embodiments, the length 1006 of the connector 340 may be between approximately 1 cm and 10 cm.

Figure 11B:
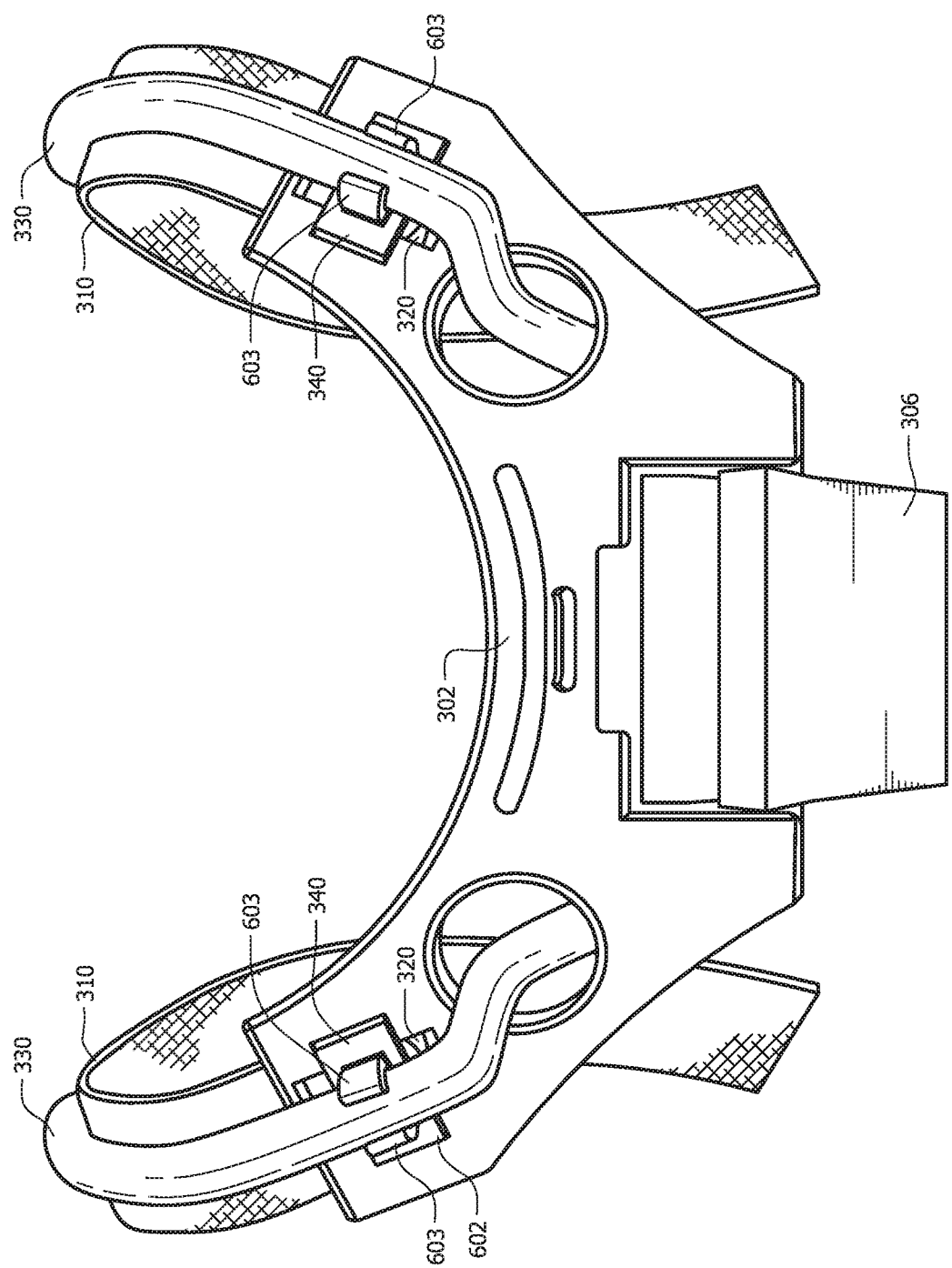

FIGS. 11A-11B illustrate detailed views of the shoulder plate 302. In FIG. 11A, the shoulder plate 302 may be connected to two connectors 340 via the slots 320 in the shoulder plate 302, and the connectors 340 may be attached to shoulder straps 310. In some embodiments, the shoulder straps 310 may be a part of a harness system 308 (shown in FIG. 3) that attaches to the backplate system 300 (shown in FIG. 3).

In FIG. 11B, the shoulder plate 302 may be attached to the backplate 306 as well as one or more hose 330. In some embodiments, the hoses 330 may be operable to carry air from a cylinder of breathable air to the user. In other embodiments, the hoses 330 may serve another purpose in the SCBA system. As shown in FIG. 11B, the hose(s) 330 may be operable to fit into the clip portion 603 of the connector(s) 340. In some embodiments, the hose 330 may comprise a flexible material, so it may be easily pushed into or pulled out of the clip 603. In some embodiments, the clip 603 may be rounded to fit around the hose 330.

The position of the slots 320 on the shoulder plate 302 may vary depending on the use of the backplate and the wishes of the user. In some embodiments, the slot 320 (and therefore connector 340) may be located in a position that allows for convenient securing of the hose 330.

Figure 12A:
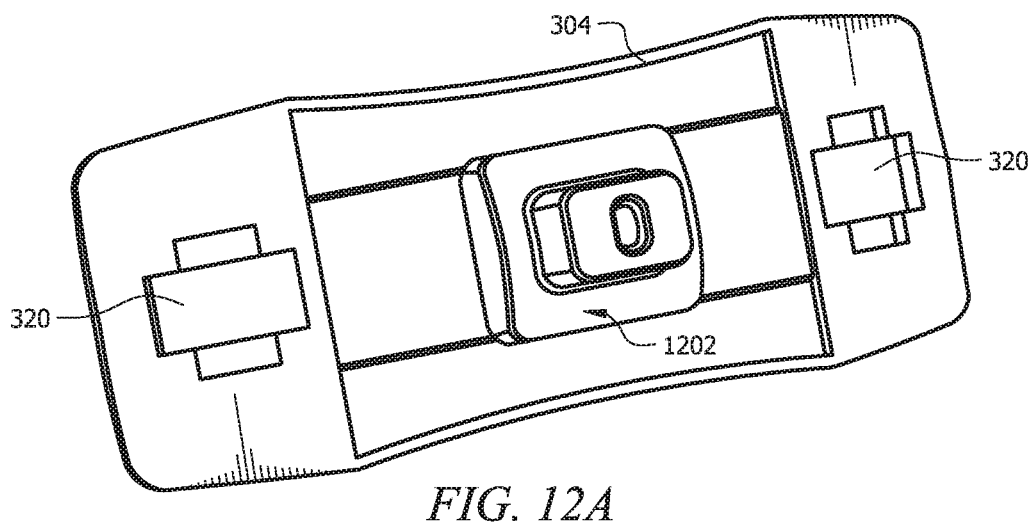
FIGS. 12A-12D illustrate detailed views of a waist plate according to an embodiment of the disclosure.

FIGS. 12A-12D illustrate detailed views of the waist plate 304. In FIG. 12A, the waist plate 304 is shown, wherein the waist plate 304 may comprise one or more slots 320 for receiving a connector 340 (shown above). The waist plate 304 may also comprise a joint 1202 for connecting the waist plate 304 to a backplate 306 (shown in FIG. 12B).

Figure 12B:
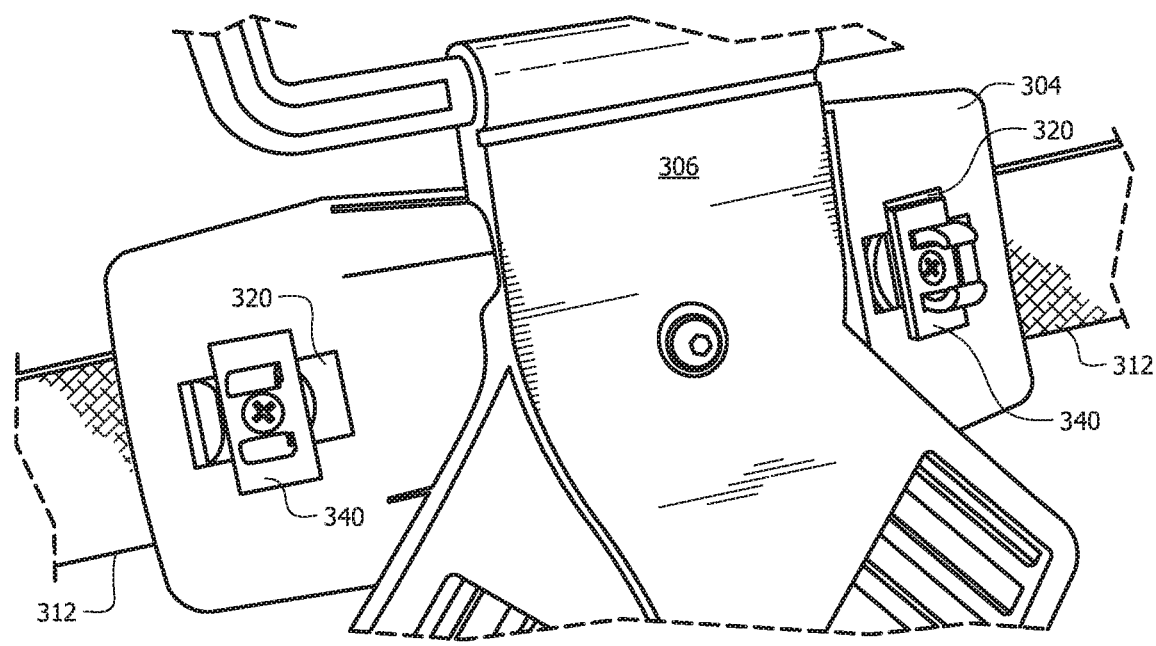
Figure 12C:
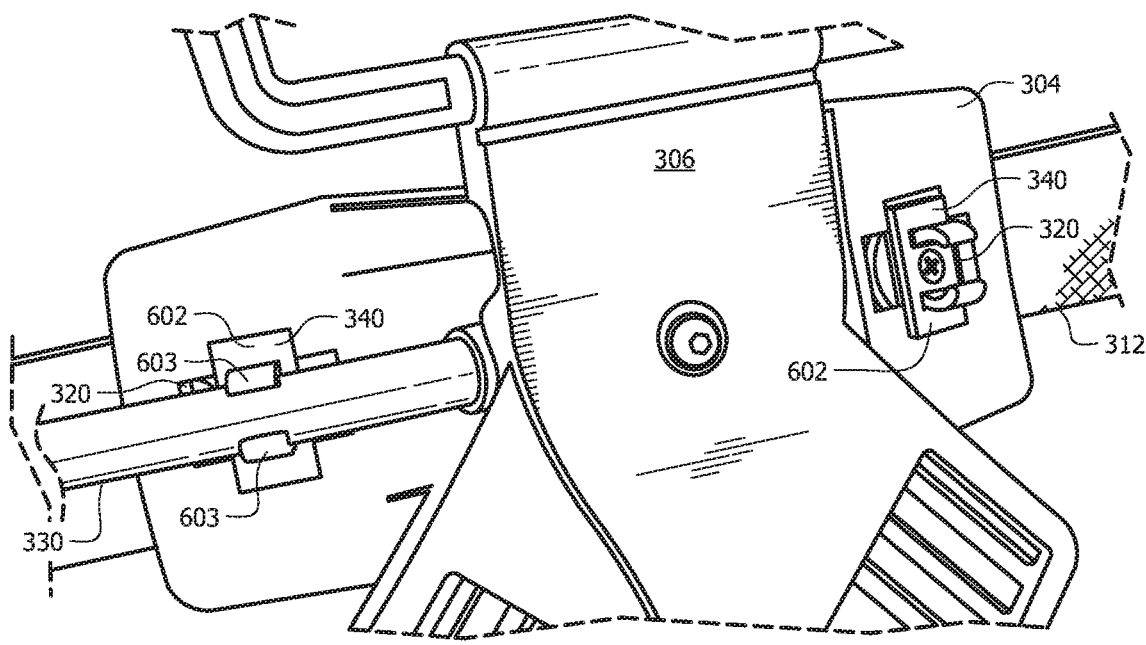
Figure 12D:
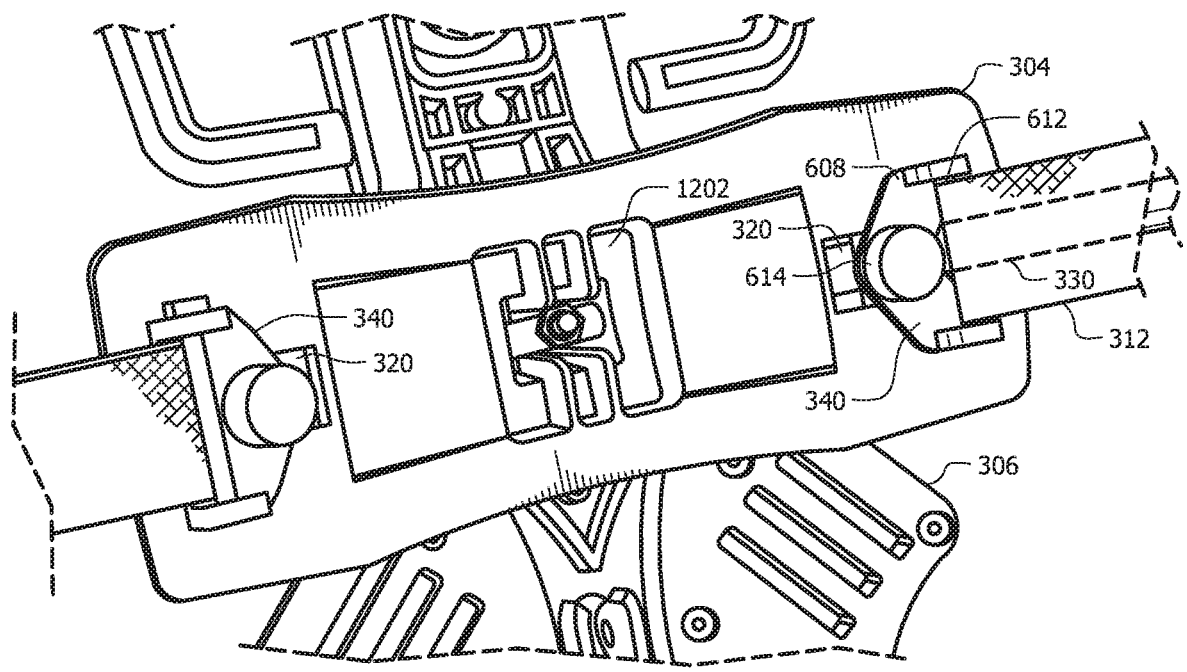

In FIG. 12B, the waist plate 304 may be attached to the backplate 306. Also, the waist plate 304 may be connected to two connectors 340 via the slots 320 in the waist plate 304, and the connectors 340 may be attached to waist straps 312. In some embodiments, the waist straps 312 may be a part of a harness system 308 (shown in FIG. 3) that attaches to the backplate system 300 (shown in FIG. 3). In FIGS. 12C-12D, the waist plate 304 may be shown without one of the waist straps 312 so that other elements may be better seen.

FIG. 12C shows a front view of the waist plate 304 and backplate 306, while FIG. 12D shows a back view of the waist plate 304 and backplate 306. In FIGS. 12C-12D, the waist plate 304 may be attached to the backplate 306 as well as one or more hose 330. In some embodiments, the hose 330 may be operable to carry air from a cylinder of breathable air to the user. In other embodiments, the hose 330 may serve another purpose in the SCBA system. As shown in FIG. 12C, the hose 330 may be operable to fit into the clip portion 603 of the connector 340. In some embodiments, the hose 330 may comprise a flexible material, so it may be easily pushed into or pulled out of the clip 603. In some embodiments, the clip 603 may be rounded to fit around the hose 330.

The position of the slots 320 on the waist plate 304 may vary depending on the use of the backplate and the wishes of the user. In some embodiments, the slot 320 (and therefore connector 340) may be located in a position that allows for convenient securing of the hose 330, such as near the end of the waist plate 304.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A backplate system for use with a self-contained breathing apparatus (SCBA) comprising:
   a backplate operable to attach to a cylinder;
   a shoulder plate operable to attach to the backplate, wherein the shoulder plate comprises one or more slots;
   a waist plate operable to attach to the backplate, wherein the waist plate comprises one or more slots;
   a harness system comprising one or more straps;
   one or more connectors operable to attach to the one or more straps and operable to fit into the one or more slots of the shoulder plate and the waist plate, wherein each connector comprises:
   a main body operable to fit through a slot of the one or more slots, and operable to be secured into a portion of the slot;
   a base operable to attach to a strap of the one or more straps;
   a piston attached to the main body operable to move and rotate with the main body, wherein the piston fits within a portion of the base;
   a spring located between a portion of the piston and a portion of the base, wherein the spring biases the piston downward, thereby biasing the main body toward the base; and
   an axis, and wherein the strap is removably attached to the axis, wherein the axis threads into an opening in the base of the connector.

2. The backplate system of claim 1, wherein the slot comprises an opening and a half-slot, wherein the opening extends through the shoulder plate or waist plate, wherein the half-slot extends halfway into a thickness of the opening, and wherein the main body fits upward through the opening, rotates 90 degrees, and fits downward into the half-slot.

3. The backplate system of claim 2, wherein the spring biases the main body into the half-slot.

4. The backplate system of claim 2, wherein the opening, the half-slot and the main body are rectangular shaped, and wherein the rectangular shape of the half-slot is rotated 90 degrees from the rectangular shape of the opening.

5. The backplate system of claim 1, wherein the connector further comprises a cover operable to fit over a portion of the piston, a portion of the base, and the spring.

6. The backplate system of claim 1, wherein the connector further comprises a clip operable to secure one or more elements of the SCBA.

7. The backplate system of claim 6, wherein the clip comprises a rounded shape operable to fit about a hose of the SCBA.

8. A connector operable to attach to a slot in a backplate system of a self-contained breathing apparatus (SCBA), wherein the connector comprises:
   a main body operable to fit through the slot, and operable to be secured into a portion of the slot;
   a base operable to attach to a strap, wherein the strap is a part of a harness system;
   a piston attached to the main body operable to move and rotate with the main body, wherein the piston fits within a portion of the base;
   a spring located between a portion of the piston and a portion of the base, wherein the spring biases the piston downward, thereby biasing the main body toward the base; and
   an axis, and wherein the strap is removably attached to the axis, wherein the axis threads into an opening in the base of the connector.

9. The connector of claim 8 further comprising a cover operable to fit over a portion of the piston, a portion of the base, and the spring.

10. The connector of claim 8, wherein the slot in the backplate system comprises an opening and a half-slot, wherein the half-slot extends halfway into a thickness of the opening, and wherein the main body fits upward through the opening, rotates 90 degrees, and fits downward into the half-slot.

11. The connector of claim 10, wherein the spring biases the main body into the half-slot.

12. The connector of claim 8, wherein the backplate system comprises a plurality of slots.

13. The connector of claim 8, wherein the slot is located on a shoulder plate of the backplate system, and wherein the strap comprises a shoulder strap.

14. The connector of claim 8, wherein the slot is located on a waist plate of the backplate system, and wherein the strap comprises a waist strap.

15. The connector of claim 8, wherein the connector further comprises a clip operable to secure one or more elements of the SCBA.

16. A backplate system for use with a self-contained breathing apparatus (SCBA) comprising:
- a backplate operable to attach to a cylinder;
- a shoulder plate operable to attach to the backplate, wherein the shoulder plate comprises one or more slots;
- a waist plate operable to attach to the backplate, wherein the waist plate comprises one or more slots;
- a harness system comprising one or more straps;
- one or more connectors operable to attach to the one or more straps and operable to fit into the one or more slots of the shoulder plate and the waist plate, wherein each connector comprises:
  - a main body operable to fit through a slot of the one or more slots, and operable to be secured into a portion of the slot;
  - a base operable to attach to a strap of the one or more straps;
  - a piston attached to the main body operable to move and rotate with the main body, wherein the piston fits within a portion of the base;
  - a spring located between a portion of the piston and a portion of the base, wherein the spring biases the piston downward, thereby biasing the main body toward the base;
  - a clip operable to secure one or more elements of the SCBA;
  - an axis, and wherein the strap is removably attached to the axis, wherein the axis threads into an opening in the base of the connector; and
  - a cover operable to fit over a portion of the piston, a portion of the base, and the spring.

* * * * *